United States Patent
Natori et al.

(10) Patent No.: US 9,875,565 B2
(45) Date of Patent: Jan. 23, 2018

(54) INFORMATION PROCESSING DEVICE, INFORMATION PROCESSING SYSTEM, AND INFORMATION PROCESSING METHOD FOR SHARING IMAGE AND DRAWING INFORMATION TO AN EXTERNAL TERMINAL DEVICE

(71) Applicant: Seiko Epson Corporation, Tokyo (JP)

(72) Inventors: Takashi Natori, Suwa (JP); Takayuki Shimizu, Matsumoto (JP); Hirohiko Kihara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 121 days.

(21) Appl. No.: 14/931,451

(22) Filed: Nov. 3, 2015

(65) Prior Publication Data
US 2016/0140740 A1    May 19, 2016

(30) Foreign Application Priority Data

Nov. 19, 2014    (JP) .................................. 2014-234866

(51) Int. Cl.
*G09B 7/04*    (2006.01)
*G06T 11/60*    (2006.01)
(Continued)

(52) U.S. Cl.
CPC ............... *G06T 11/60* (2013.01); *G09B 7/02* (2013.01); *G09B 7/04* (2013.01); *G09B 5/08* (2013.01); *G09B 7/00* (2013.01); *G09B 7/07* (2013.01)

(58) Field of Classification Search
None
See application file for complete search history.

(56) References Cited

U.S. PATENT DOCUMENTS

| | | | |
|---|---|---|---|
| 8,965,460 B1* | 2/2015 | Rao ......................... | G06F 3/005 455/566 |
| 2009/0265660 A1* | 10/2009 | Nobori .................. | G06F 3/0483 715/788 |

(Continued)

FOREIGN PATENT DOCUMENTS

JP    2013-135422 A    7/2013

*Primary Examiner* — Xiao Wu
*Assistant Examiner* — Steven Elbinger
(74) *Attorney, Agent, or Firm* — ALG Intellectual Property, LLC

(57) ABSTRACT

An information processing device communicates with display terminals. The information processing device includes an image information acquisition section adapted to obtain image information, a display control section adapted to perform control of displaying an image based on the image information obtained, a drawing information acquisition section adapted to obtain drawing information adapted to draw a second image so as to be superimposed on a first image displayed based on first image information, a determination section adapted to determine whether or not the first image information is the same as delivered image information having already been delivered to the terminal device, and a delivery control section adapted to deliver the drawing information to the terminal device without delivering the first image information in a case in which it is determined that the first image information and the delivered image information are the same as each other.

7 Claims, 14 Drawing Sheets

(51) Int. Cl.
*G09B 7/02* (2006.01)
*G09B 7/00* (2006.01)
*G09B 5/08* (2006.01)
*G09B 7/07* (2006.01)

(56) References Cited

U.S. PATENT DOCUMENTS

2012/0284635 A1\* 11/2012 Sitrick ................ G06Q 10/101
　　　　　　　　　　　　　　　　　　　　715/751
2013/0162671 A1　 6/2013 Fujita et al.
2013/0304580 A1\* 11/2013 Feadler .............. G06Q 30/0267
　　　　　　　　　　　　　　　　　　　　705/14.64

\* cited by examiner

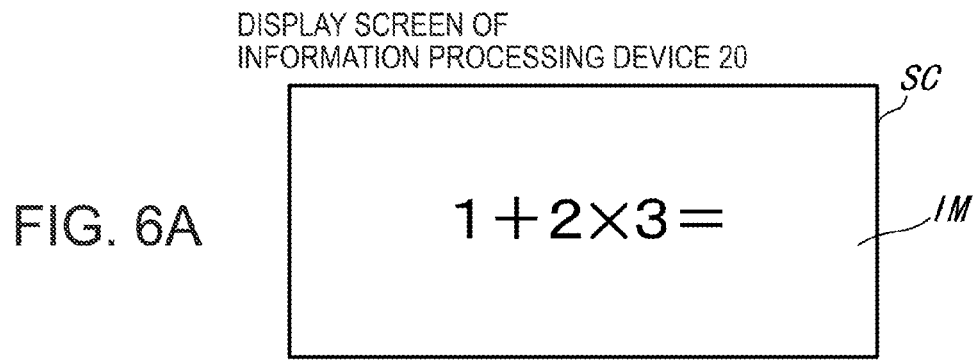
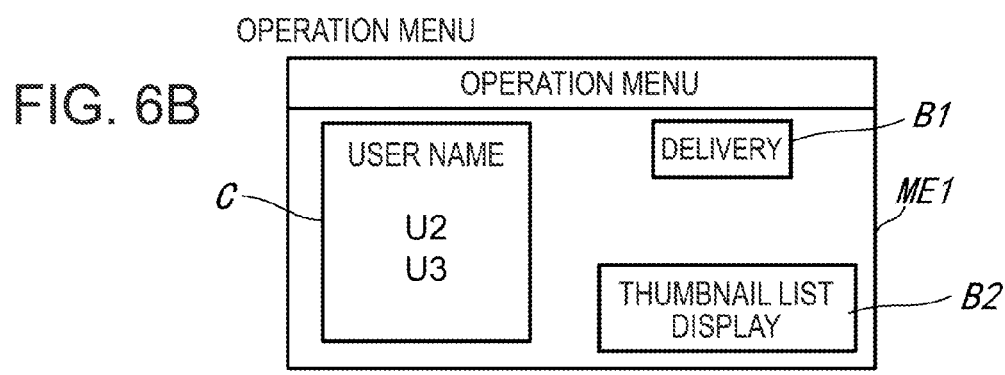
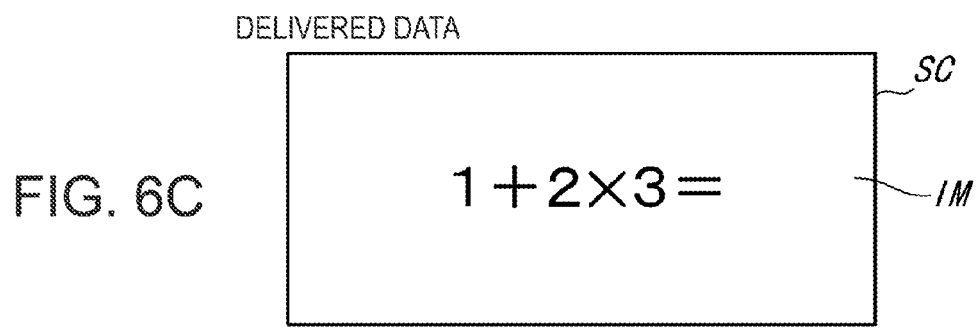
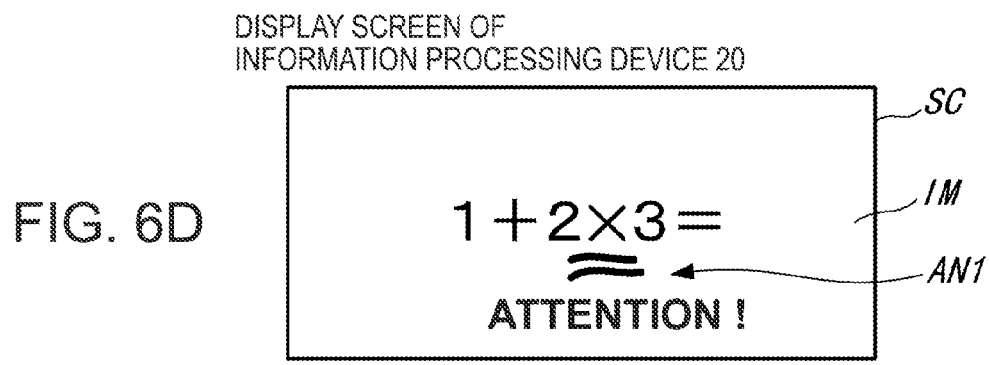

DISPLAY SCREEN OF DISPLAY TERMINAL 30A

DISPLAY SCREEN OF DISPLAY TERMINAL 30A

TRANSMISSION DATA OF DISPLAY TERMINAL 30A

DISPLAY SCREEN OF DISPLAY TERMINAL 30B

TRANSMISSION DATA OF DISPLAY TERMINAL 30B

DISPLAY ATTRIBUTE D1

SET TIME Ts HAS ELAPSED

DISPLAY ATTRIBUTE D2

SET TIME Ts HAS ELAPSED

DISPLAY SCREEN OF DISPLAY TERMINAL 30

DISPLAY SCREEN OF INFORMATION PROCESSING DEVICE 20
(DISPLAY ATTRIBUTE D1)

SET TIME Ts HAS ELAPSED

DISPLAY SCREEN OF INFORMATION PROCESSING DEVICE 20
(DISPLAY ATTRIBUTE D2)

SET TIME Ts HAS ELAPSED

INFORMATION PROCESSING DEVICE, INFORMATION PROCESSING SYSTEM, AND INFORMATION PROCESSING METHOD FOR SHARING IMAGE AND DRAWING INFORMATION TO AN EXTERNAL TERMINAL DEVICE

CROSS-REFERENCE TO RELATED APPLICATION

The entire disclosure of Japanese Patent Application No. 2014-234866 filed Nov. 19, 2014 is expressly incorporated by reference herein.

BACKGROUND

1. Technical Field

The invention relates to a technology for sharing a screen including, for example, an image drawn by a user between two or more devices.

2. Related Art

In the past, there has been known a system in which a delivery-side device delivers image information used for display of a screen to an external receiving-side device to thereby share the same screen between the delivery-side device and the receiving-side device. The screen thus shared includes an image object such as a character or a figure drawn by, for example, the user in addition to a background image corresponding to the background in some cases. In the system of this kind, in the case in which, for example, the number of receiving-side devices is large, a load (communication load) applied to a network becomes excessive due to the delivery of the data for sharing the screen in some cases.

As a technology for reducing the communication load, there can be cited a technology disclosed in, for example, JP-A-2013-135422 (Document 1). In the technology described in Document 1, the delivery-side device (a terminal device) firstly delivers image data corresponding to a background image, and then delivers handwritten image data having been input on the screen without delivering the image data. The receiving-side device (an image combining device) combines the handwritten image data having been received later with the image data corresponding to the background image received earlier to thereby generate combined screen data.

In the technology described in Document 1, since there is the premise that the delivery-side device and the receiving-side device display the background image based on the same image data, the share of the screen becomes possible due to the subsequent delivery of the handwritten image data. However, in the situation of, for example, a presentation in a conference, the handwritten image is drawn, while the delivery-side device switches the background images to be displayed point by point, or a material created on the spot is displayed as the background image. In such a case, the background images to be displayed do not coincide with each other between the delivery-side device and the receiving-side device in some cases. In the technology described in Document 1, the case in which the background images to be displayed in the delivery-side device and the receiving-side device do not coincide with each other is not considered.

SUMMARY

An advantage of some aspects of the invention is to update the screen, which includes an image drawn, and is shared between an information processing device and an external terminal device, while suppressing an increase in the communication load.

An information processing device according to an aspect of the invention is an information processing device adapted to communicate with an external terminal device adapted to display an image, the information processing device including an image information acquisition section adapted to obtain image information, a display control section adapted to perform control of displaying an image based on the image information obtained, a drawing information acquisition section adapted to obtain drawing information to be used to draw a second image, the second image is to be superimposed on a first image displayed based on first image information, a determination section adapted to determine whether or not the first image information is the same as delivered image information having already been delivered to the terminal device, and a delivery control section adapted to deliver the first image information and the drawing information to the terminal device in a case in which it is determined that the first image information and the delivered image information are different from each other, and deliver the drawing information to the terminal device without delivering the first image information in a case in which it is determined that the first image information and the delivered image information are the same as each other.

According to the aspect of the invention, in the case in which it is determined that the first image information used for displaying the image in the information processing device and the delivered image information having already been delivered to the terminal device are the same as each other, the drawing information is delivered to the terminal device without delivering the first image information. Therefore, the update of the screen including the image thus drawn and shared between the information processing device and the external terminal device can be performed while suppressing the increase in the communication load.

In the aspect of the invention, the delivery control section may deliver attribute information adapted to designate a display attribute of the second image to the terminal device in addition to the drawing information.

According to the aspect of the invention with this configuration, it is possible to display the image, which is drawn in the information processing device, in the terminal device in accordance with the display attribute designated by the information processing device.

In the aspect of the invention, the attribute information may include information adapted to designate one of the terminal device to be made to display the second image and timing of displaying the second image.

According to the aspect of the invention with this configuration, it is possible to display the image, which is drawn in the information processing device, in the terminal device while designating the terminal device or the display timing.

In the aspect of the invention, the information processing device may further include an information receiving section adapted to receive drawing information, which is adapted to draw a third image so as to be superimposed on the first image, from the terminal device, and the display control section may draw the third image so as to be superimposed on the first image based on the drawing information received.

According to the aspect of the invention with this configuration, since the drawing information for drawing the third image is received from the terminal device without receiving the first image information from the terminal device, and then the third image is drawn so as to be superimposed on the first image, the update of the screen including the image drawn in the terminal device can be performed while suppressing the increase in the communication load.

In the aspect of the invention, the information receiving section may receive attribute information adapted to designate a display attribute of the third image in addition to the drawing information, and the display control section may draw the third image in accordance with the display attribute designated by the attribute information received.

According to the aspect of the invention with this configuration, it is possible to display the image, which is drawn in the terminal device, in accordance with the display attribute designated by the terminal device.

The invention can also be recognized as an information processing system, and information processing method, and a program besides the information processing device.

BRIEF DESCRIPTION OF THE DRAWINGS

The invention will be described with reference to the accompanying drawings, wherein like numbers reference like elements.

FIGS. 6A through 6E are explanatory diagrams of a specific example of the delivery operation of the information processing device according to the embodiment.

DESCRIPTION OF AN EXEMPLARY EMBODIMENT

An embodiment of the invention will hereinafter be explained with reference to the accompanying drawings.

Figure 1:
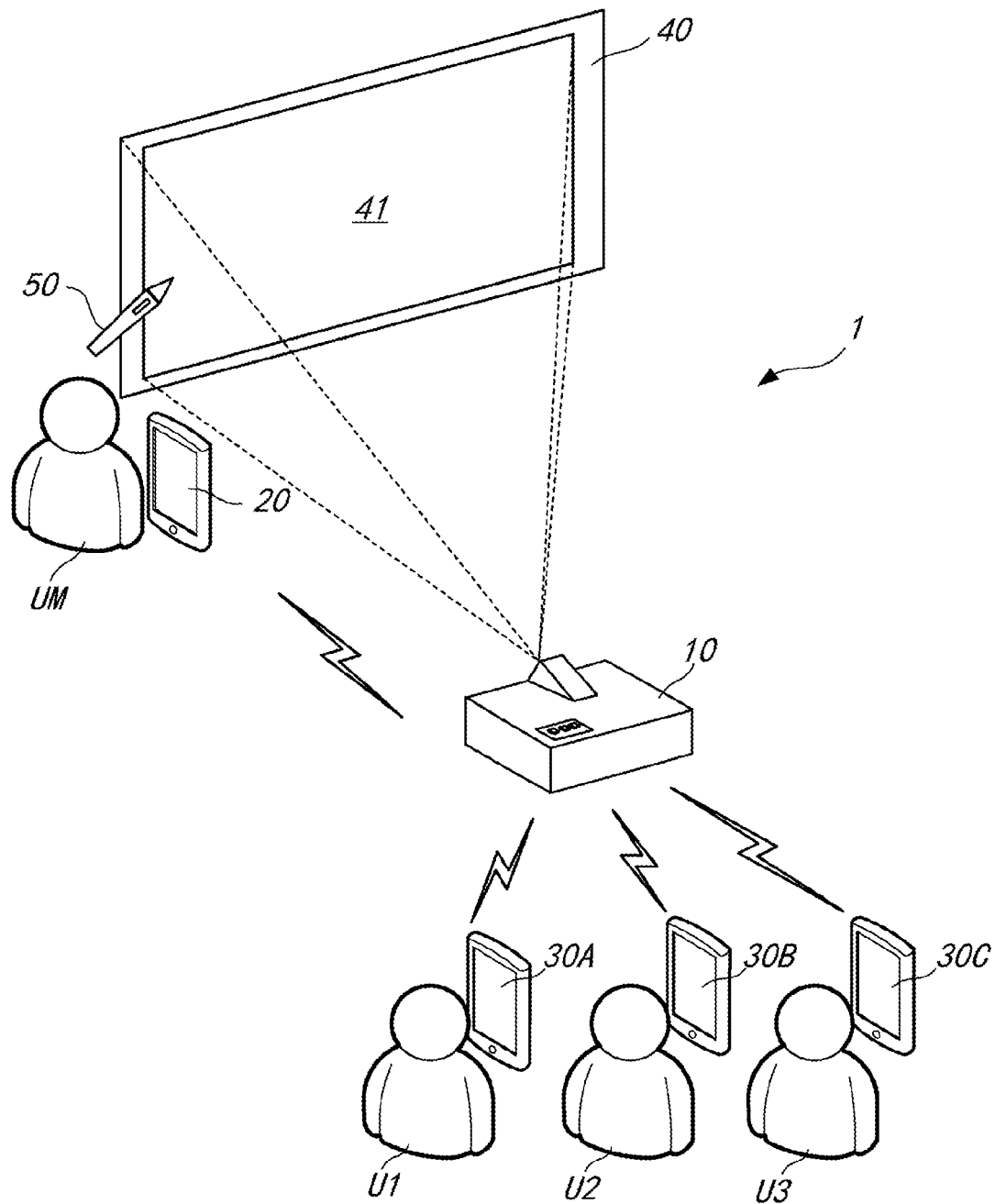
FIG. 1 is a diagram showing an overall configuration of an information processing system according to an embodiment of the invention.

FIG. 1 is a diagram showing an overall configuration of an information processing system 1 according to the embodiment of the invention. The information processing system 1 is provided with a projector 10, an information processing device 20, and a plurality of display terminals 30 (30A, 30B, and 30C).

Although the case in which the display terminals 30 included in the information processing system 1 are formed of three display terminals 30A, 30B, and 30C will hereinafter be explained, the number of display terminals 30 included in the information processing system 1 can also be equal to or smaller than two, or equal to or larger than four.

The projector 10 is, for example, a liquid crystal projector, and is a projection display device for projecting an image on a screen 40. The projector 10 projects a color image in a projection area 41 of the screen 40 based on, for example, image signals corresponding respectively to color components of the three primary colors of red (R), green (G), and blue (B). The screen 40 here is a reflective screen, and is a projection surface on which the image is projected by the projector 10.

The information processing device 20 is connected to the projector 10 with wireless communication, and delivers the data used for display of the screen to the projector 10 and the display terminals 30. Specifically, the information processing device 20 delivers image information for displaying a background image (a first image) corresponding to the background, and drawing information for drawing an image object (a second image) so as to be superimposed on the background image. The image object is an image drawn by, for example, a handwritten operation of the user. As the image object, there can be cited a handwritten image representing a trajectory of a position pointed on the background image, an image, which has previously been prepared, and is disposed so as to be superimposed on the background image, and so on. The user using the information processing device 20 is hereinafter referred to as a "user UM." The user UM is, for example, a teacher conducting classes in a school.

The display terminals 30 are each a terminal device (a display device) which is connected to the projector 10 with wireless communication, and receives the screen data delivered by the information processing device 20 via the projector 10. The display terminals 30 each display the screen based on the data delivered by the information processing device 20. Specifically, the display terminals 30 each display the background image based on the image information, and draw the image object so as to be superimposed on the background image based on the drawing information. The users respectively using the display terminals 30A, 30B, and 30C are referred to as "user UA," "user UB," and "user UC" in this order. The users UA, UB, and UC are, for example, students attending the class in the school.

It should be noted that the projector 10, the information processing device 20, and the plurality of display terminals 30 can be connected with wire instead of being connected wirelessly, and it is assumed that the method of communication does not particularly matter.

A pointing object 50 here is a pen-type device (an operation device), and is used by the user U for pointing a position on the screen 40. The pointing object 50 is used for performing an operation of handwriting a character or a figure so as to be superimposed on the projection area 41, or performing an operation of selecting an operable object included in the projection area 41.

It should be noted that the pointing object 50 is not limited to the pen type, but can be an operation device having a different shape such as a rod shape. Further, the pointing object 50 can be replaced with a hand or a finger of the user U instead of the operation device.

Figure 2:
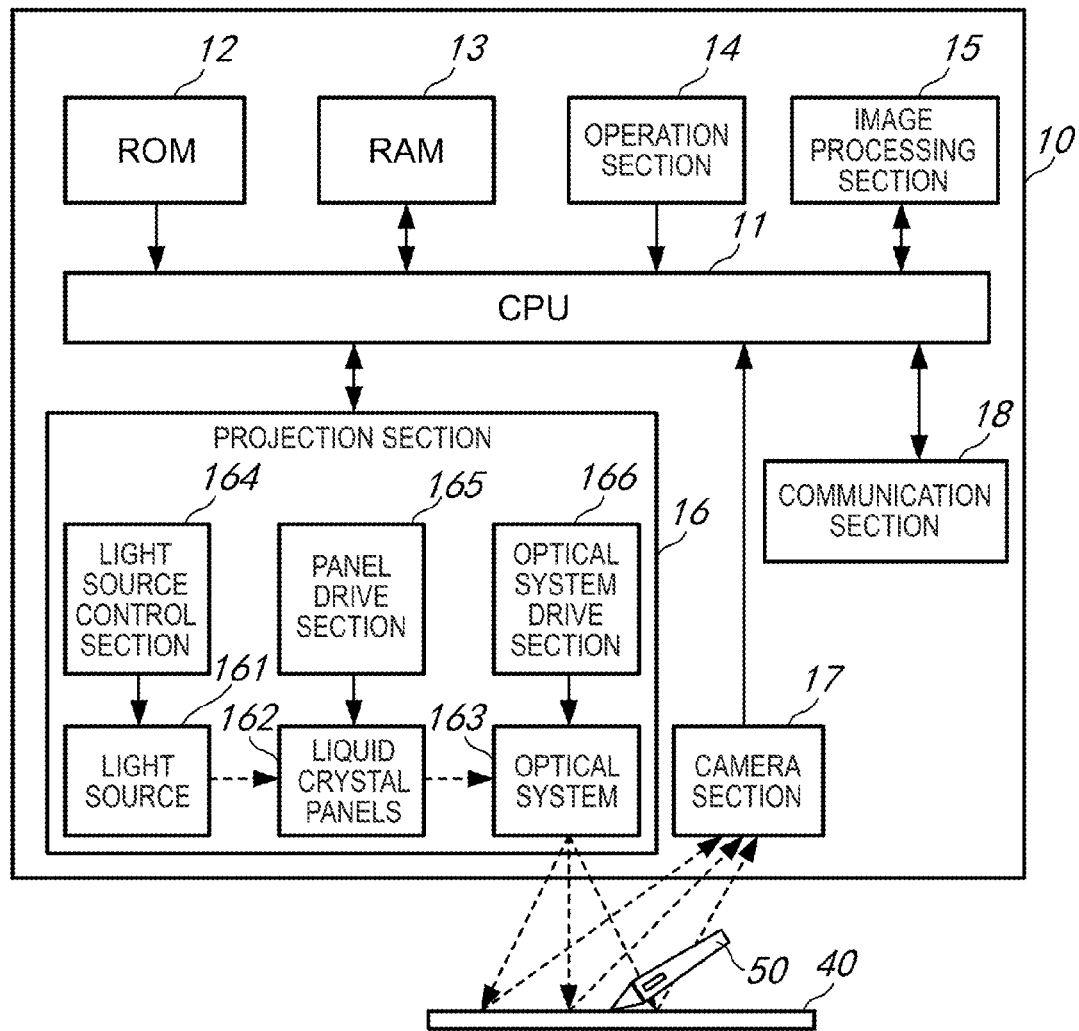
FIG. 2 is a block diagram showing a hardware configuration of a projector according to the embodiment.

FIG. 2 is a block diagram showing a hardware configuration of the projector 10. As shown in FIG. 2, the projector 10 is provided with a central processing unit (CPU) 11, a read only memory (ROM) 12, a random access memory (RAM) 13, an operation section 14, an image processing section 15, a projection section 16, a camera section 17, and a communication section 18.

The CPU 11 is a processor for reading out a program, which is stored in a storage device such as the ROM 12, in the RAM 13 and then executing the program to thereby control each part of the projector 10.

The operation section 14 is an operation device provided with operators (e.g., physical keys) for performing ON/OFF of the power and a variety of operations of the projector 10.

The image processing section 15 is provided with an image processing circuit such as an application specific integrated circuit (ASIC), and controls the image processing performed by the projector 10. The image processing section 15 generates an image signal for projecting an image on the screen 40 based on the image information and the drawing information received via, for example, the communication section 18 in accordance with the control by the CPU 11. The image processing section 15 performs the image processing such as a resizing process, or a keystone distortion correction besides the above.

The projection section 16 projects the image on the screen 40 based on the image data on which the image processing has been performed by the image processing section 15. The projection unit 16 includes a light source 161, liquid crystal panels 162, an optical system 163, a light source control section 164, a panel drive section 165, and an optical system drive section 166. The light source 161 is a solid-state light source including, for example, light emitting diodes (LED) or semiconductor diodes, and emits light to the liquid crystal panels 162. The liquid crystal panels 162 are each, for example, a transmissive liquid crystal panel, and are each a light modulator for modulating the light input from the light source 161. The liquid crystal panels 162 are disposed corresponding respectively to the three primary colors of RGB. The optical system 163 is provided with, for example, lenses and drive circuit for adjusting the lenses, and enlarges the light (the image light) modulated by the liquid crystal panels 162, and then projects the result on the screen 40. The light source control section 164 drives the light source 161 with the control by the CPU 11. The panel drive section 165 drives the liquid crystal panels 162 based on the image signal supplied from the CPU 11. The optical system drive section 166 drives the drive circuit of the optical system 163 with the control by the CPU 11. It should be noted that as the light modulator, it is possible to adopt a reflective liquid crystal panel, or to adopt a digital micromirror device (DMD) or the like.

The camera section 17 has an image sensor (e.g., a CMOS sensor or a CCD sensor), and images the screen 40. The pointing object 50 repeatedly emits light at predetermined intervals. The CPU 11 detects the position on a projection area 41 pointed by the pointing object 50 based on the emitted light from the pointing object 50 imaged by the camera section 17.

It should be noted that it is also possible for the projector 10 to detect the position pointed by the reflected light by the pointing object 50 using, for example, a method of using a light curtain or the like. Further, it is also possible for the projector 10 to detect the position thus pointed by recognizing the shape of the pointing object 50 using pattern recognition or the like.

The communication section 18 is an interface to be connected to the information processing device 20 and the plurality of display terminals 30 for communication.

Figure 3:
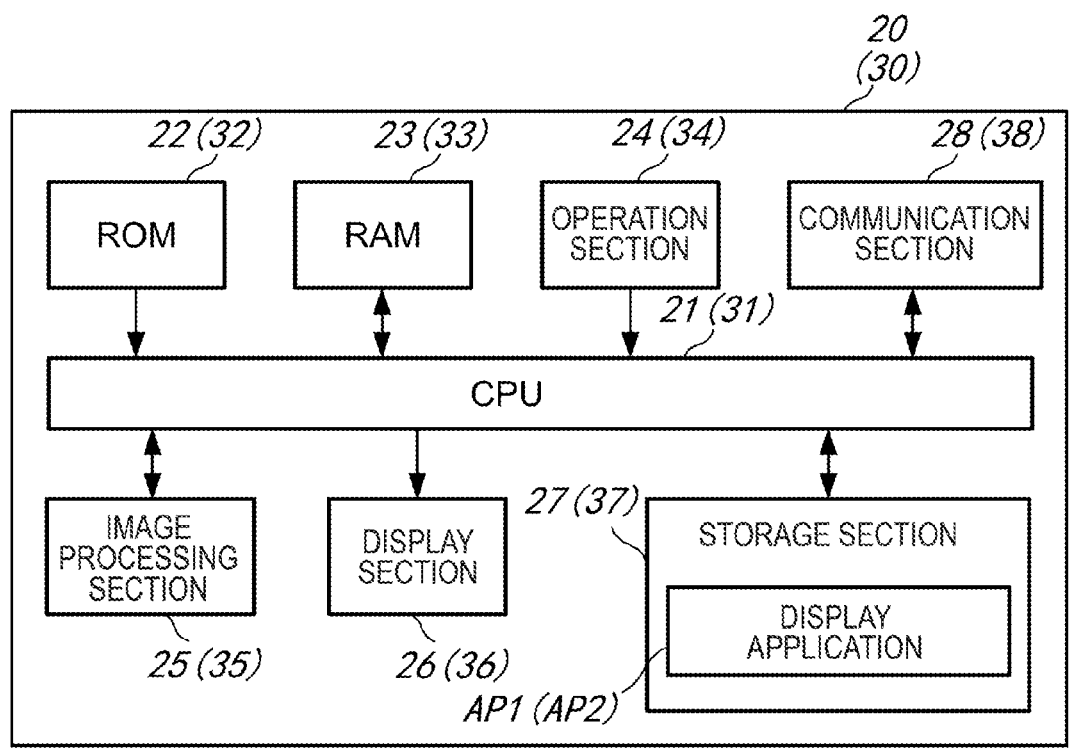
FIG. 3 is a block diagram showing a hardware configuration of an information processing device and a display terminal according to the embodiment.

FIG. 3 is a block diagram showing a hardware configuration of the information processing device 20 and each of the display terminals 30. The information processing device 20 and the display terminals 30 are each a tablet-type terminal device in the present embodiment, and the hardware configuration is common to the information processing device 20 and the display terminals 30. Therefore, the explanation will hereinafter be presented with a focus on the hardware configuration of the information processing device 20.

The information processing device 20 is provided with a CPU 21, a ROM 22, a RAM 23, an operation section 24, an image processing section 25, a display section 26, a storage section 27, and a communication section 28.

The CPU 21 is a processor for reading out a program, which is stored in the ROM 22 or the storage section 27, in the RAM 23 and then executing the program to thereby control each part of the information processing device 20. The operation section 24 is an operation device provided with a touch screen or a plurality of operators (e.g., physical keys) for receiving the input operation by the user. The image processing section 25 is provided with an image processing circuit such as an ASIC, and performs a variety of types of image processing in accordance with the control by the CPU 21. The display section 26 is, for example, a liquid crystal display, and displays a variety of images in accordance with the control by the CPU 21. The storage section 27 is provided with a storage medium such as a hard disk, and stores a variety of types of data. The storage section 27 stores, for example, an operating system (OS) and a display application AP1 operating on the OS. The display application AP1 is an application program for implementing a function related to display of the screen of the information processing device 20. The communication section 28 is an interface to be connected to the projector 10 for communication.

The display terminals 30 are each provided with a CPU 31, a ROM 32, a RAM 33, an operation section 34, an image processing section 35, a display section 36, a storage section 37, and a communication section 38. The hardware elements of each of the display terminals 30 can be explained by replacing the term "information processing device 20" with the term "display terminal 30" and replacing the term "CPU 21" with the term "CPU 31" in the explanation of the hardware elements having the same names in the information processing device 20.

It should be noted that the storage section 37 of each of the display terminals 30 stores a display application AP2. The display application AP2 is an application program for implementing a function related to display of the screen of each of the display terminals 30.

Figure 4:
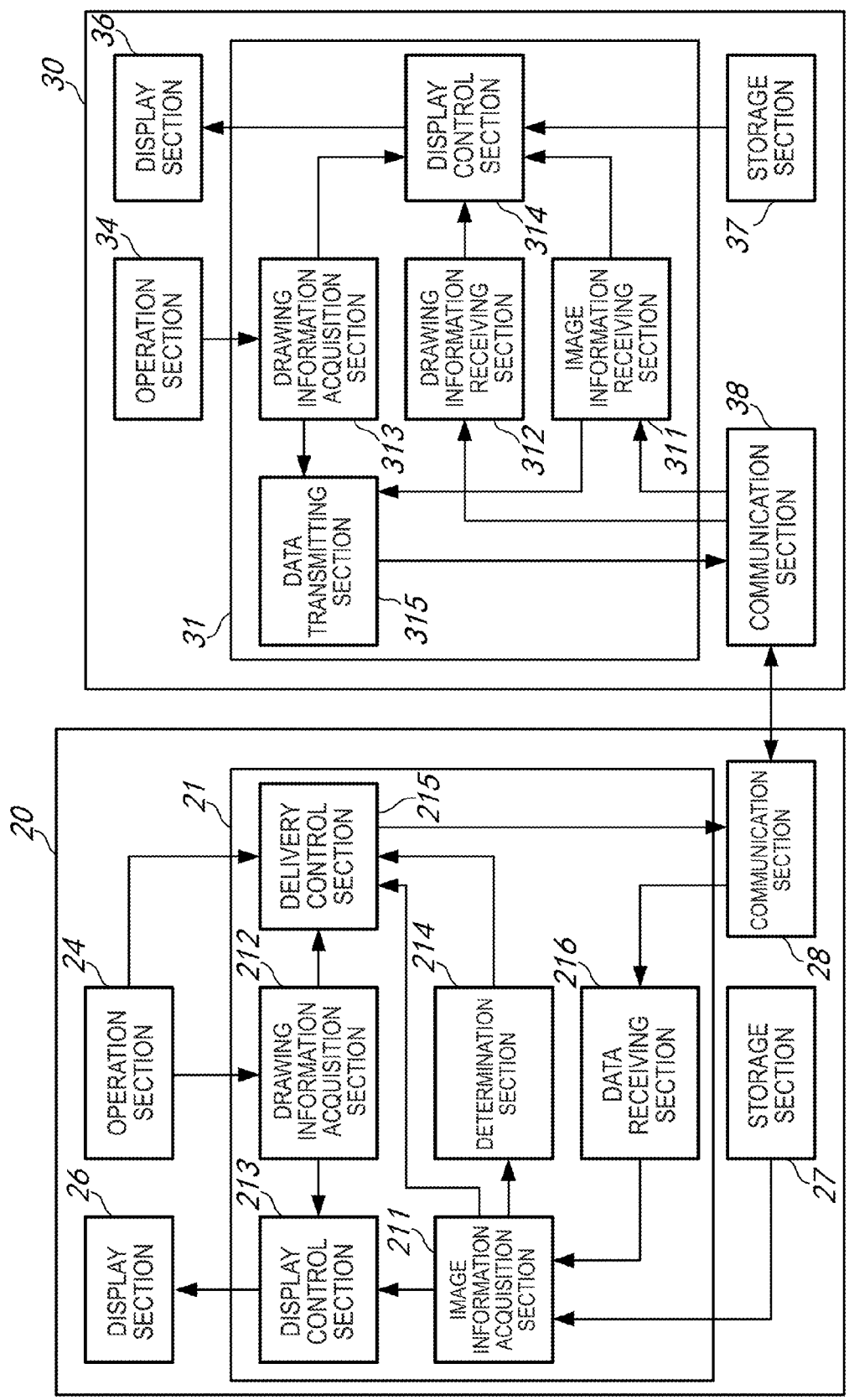
FIG. 4 is a block diagram showing a functional configuration of the information processing device and the display terminal according to the embodiment.

FIG. 4 is a block diagram showing a functional configuration of the information processing device 20 and one of the display terminals 30. The CPU 21 of the information processing device 20 executes the display application AP1 to thereby implement functions corresponding to an image information acquisition section 211, a drawing information acquisition section 212, a display control section 213, a determination section 214, a delivery control section 215, and a data receiving section 216.

The image information acquisition section 211 obtains the image information representing the background image. The image information acquisition section 211 obtains, for example, image information generated based on data (a file) stored in the storage section 27, or image information received by the data receiving section 216.

The drawing information acquisition section 212 obtains the drawing information for drawing an image object so as to be superimposed on the background displayed on the display section 26. The drawing information acquisition section 212 obtains the drawing information for drawing the image object in accordance with an operation performed on the operation section 24, or an operation of pointing a position on the projection area 41 using the pointing object 50.

The display control section 213 controls the display of the display section 26. The display control section 213 displays the background image based on the image information obtained by the image information acquisition section 211. Further, the display control section 213 draws the image object so as to be superimposed on the background image based on the drawing information. The drawing information is, for example, drawing information obtained by the drawing information acquisition section 212, or drawing information received by the data receiving section 216.

The determination section 214 determines whether the image information (first image information) representing the background image displayed on the display section 26 and the image information (delivered image information, second image information) having already been delivered to the display terminal 30 are the same as each other or different from each other. In other words, the determination section 214 determines whether or not the image information representing the background image displayed on the display section 26 has already been delivered to the display terminal 30.

The delivery control section 215 performs the control of delivering the data for sharing the screen between the information processing device 20 and the display terminal 30 in accordance with a delivery operation performed on the operation section 24. In the case in which the determination section 214 has determined that the image information representing the background image displayed on the display section 26 and the image information having already been delivered to the display terminal 30 are different from each other, the delivery control section 215 delivers the image information of the background image displayed on the display section 26 and the drawing information obtained by the drawing information acquisition section 212 to the display terminal 30 via the communication section 28. In the case in which the determination section 214 has determined that the image information representing the background image displayed on the display section 26 and the image information having already been delivered to the display terminal 30 are the same as each other, the delivery control section 215 delivers the drawing information obtained by the drawing information acquisition section 212 to the display terminal 30 via the communication section 28 without delivering the image information of the background image displayed on the display section 26.

The data receiving section 216 receives the data transmitted by a data transmitting section 315 of the display terminal 30. The data receiving section 216 receives, for example, the image information representing the background image displayed on the display terminal 30. Further, the data receiving section 216 receives, for example, the drawing information representing the image object (a third image) drawn so as to be superimposed on the background image displayed on the display terminal 30.

The CPU 31 of the display terminal 30 executes the display application AP2 to thereby implement functions corresponding to an image information receiving section 311, a drawing information receiving section 312, a drawing information acquisition section 313, a display control section 314, and the data transmitting section 315.

The image information receiving section 311 receives the image information having been delivered by the delivery control section 215 via the communication section 38.

The drawing information receiving section 312 receives the drawing information having been delivered by the delivery control section 215 via the communication section 38.

The drawing information acquisition section 313 obtains the drawing information for drawing an image object so as to be superimposed on the background displayed on the display section 36. The drawing information acquisition section 313 obtains the drawing information for drawing the image object in accordance with the operation performed on the operation section 34.

The display control section 314 controls the display of the display section 36. The display control section 314 displays the background image based on the image information obtained by the image information receiving section 311. Further, the display control section 314 draws the image object so as to be superimposed on the background image based on the drawing information. The drawing information is, for example, drawing information received by the drawing information receiving section 312, or drawing information obtained by the drawing information acquisition section 313.

The data transmitting section 315 transmits data to the information processing device 20. The data transmitting section 315 transmits the image information representing the background image displayed on the display section 36 to the information processing device 20 via the communication section 28. Further, the data transmitting section 315 transmits the drawing information obtained by the drawing information acquisition section 313 to the information processing device 20 via the communication section 38.

Then, the operation of the present embodiment will be explained.

Delivery Operation

Figure 5:
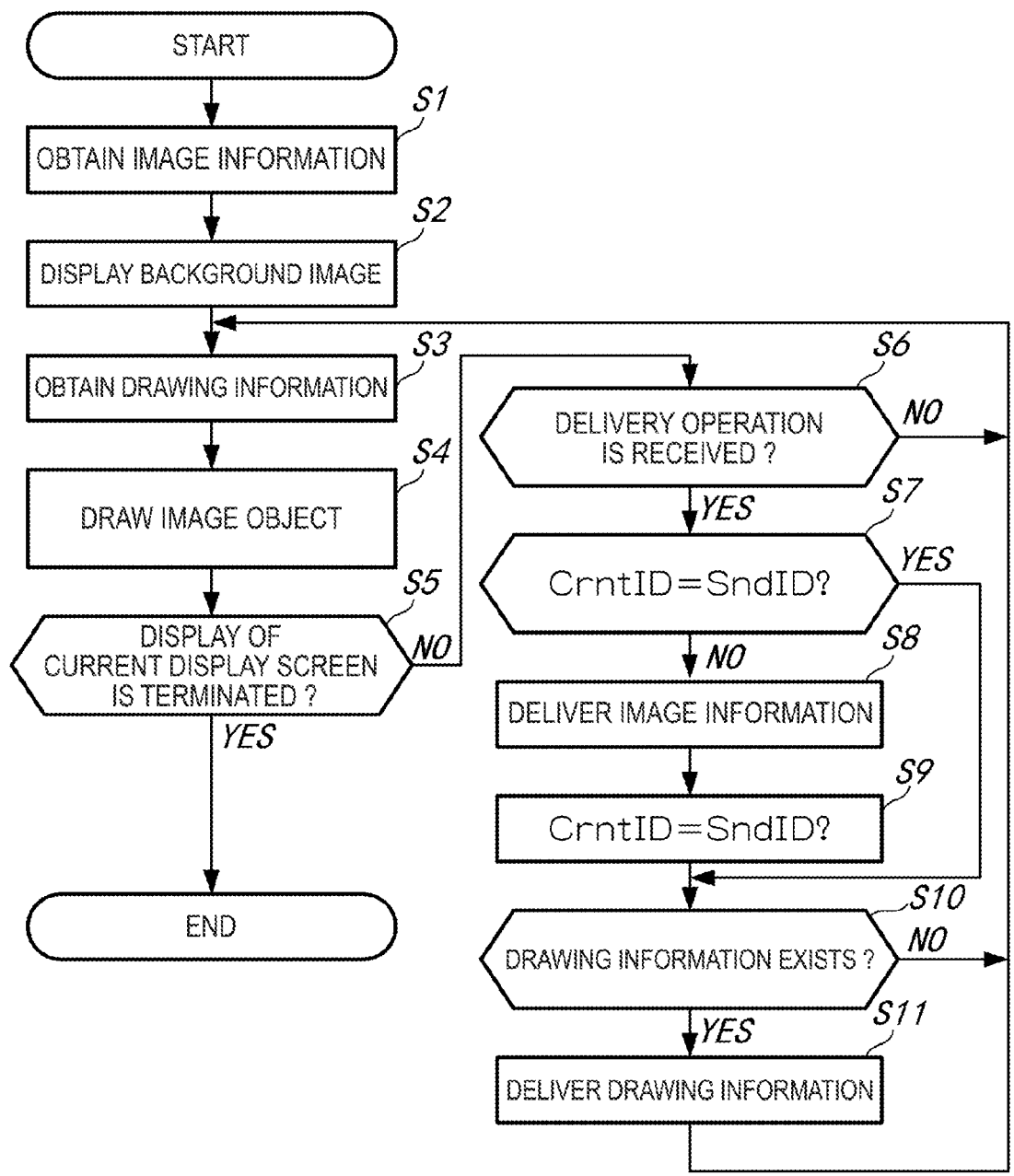
FIG. 5 is a flowchart showing a delivery operation of the information processing device according to the embodiment.

FIG. 5 is a flowchart showing the delivery operation of the information processing device 20. The delivery operation denotes an operation related to the delivery of the data for sharing the screen between the information processing device 20 and the display terminal 30. FIGS. 6A through 6E are diagrams for explaining a specific example of the delivery operation.

The CPU 21 of the information processing device 20 obtains (step S1) the image information for displaying the background image. The CPU 21 reads out predetermined data (file) from, for example, the storage section 27, and then generates the image information representing the background image to obtain the image information. Then, the CPU 21 displays (step S2) the background image on the display section 26 based on the image information thus obtained. Here, the CPU 21 displays a screen SC shown in FIG. 6A. The screen SC includes the background image IM representing a problem statement of "1+2×3=."

Then, the CPU 21 obtains (step S3) the drawing information in accordance with the operation performed by the user UM on the operation section 24, or the position pointed on the projection area 41 using the pointing object 50, and then draws (step S4) the image object so as to be superimposed on the background image of the current display screen based on the drawing information thus obtained.

Here, it is assumed that the operation for drawing the image object has not been performed by the user UM. In this case, the CPU 21 skips the process of the step S4.

Then, the CPU 21 determines (step S5) whether or not the display of the current display screen will be terminated. The CPU 21 determines whether or not the current display screen will be closed, or whether or not the display is changed to another screen in accordance with, for example, the operation performed on the operation section 24. Here, in the case in which it is determined that the current display screen is not terminated, namely the display of the current display screen is continued (NO in the step S5), the CPU 21 determines (step S6) whether or not the delivery operation has been received. Here, the CPU 21 displays an operation menu ME1 shown in FIG. 6B on the display section 26, and determines whether or not the delivery operation has been received using the operation menu ME1.

In the operation menu ME1 shown in FIG. 6B, the operation button B1 denoted by "DELIVERY" is the operation button for performing the delivery operation. The operation button B2 denoted by "THUMBNAIL LIST DISPLAY" is the operation button for instructing that the current display screen of the display terminal 30 is displayed as a list using the thumbnails. The menu C is a menu for designating the display terminal 30 as a counterpart sharing the screen with the information processing device 20. In the case in which the specific display terminal 30 is not designated using the menu C, all of the display terminals 30 (here, the display terminals 30A through 30C) in the information processing system 1 are deemed to be designated.

It should be noted that the CPU 21 controls so that the operation menu ME1 is also displayed in the projector 10 in addition to the display section 26. It should be noted that it is also possible for the CPU 21 to perform the control of not making the operation menu ME1 be displayed in the projection area 41 of the projector 10 while making the display section 26 display the operation menu ME1.

Here, in the case in which the delivery operation is received using the operation button B1, the CPU 21 determines "YES" in the step S6. Then, the CPU 21 determines (step S7) whether or not CrntID stored in the storage section 27 and SndID coincide with each other. The CrntID is identification information for uniquely identifying the image information (the first image information) of the background image currently displayed on the display section 26. The SndID is identification information for uniquely identifying the image information (delivered image information, second image information) having already been delivered to the display terminal 30. Here, the SndID includes the identification information of all of the image information of the background images having already been delivered to the display terminal 30. In the case in which CrntID=SndID is true, it means that the image information of the background image currently displayed in the information processing device 20 has already been delivered to the display terminal 30. In the case in which CrntID≠SndID is true, it means that the image information of the background image currently displayed in the information processing device 20 has not yet been delivered to the display terminal 30.

Here, since the image information of the background image IM has not yet been delivered, CrntID≠SndID is true, and the CPU 21 determines "NO" in the step S7. In this case, the CPU 21 delivers (step S8) the image information of the background image currently displayed to the display terminal 30 via the communication section 28. The image information is associated with the CrntID. The image information delivered by the information processing device 20 here is the image information of the screen SC (the background image IM) shown in FIG. 6C, and represents the same image as shown in FIG. 6A. Then, after the CPU 21 delivers the image information, the CPU 21 updates (step S9) the SndID so that CrntID=SndID becomes true.

Then, the CPU 21 determines (step S10) whether or not the current display screen includes the drawing information. Here, the drawing information is not obtained in accordance with the operation of the operation section 24, and the image object is not displayed. Therefore, the CPU 21 determines "NO" in the step S10, and then returns to the process in the step S3.

Then, when the CPU 21 obtains (step S3) the drawing information, the CPU 21 draws (step S4) the image object so as to be superimposed on the background image currently displayed based on the drawing information thus obtained. Here, it is assumed that the user UM handwrites an image including a double line and "ATTENTION!" below the symbol "x" as a hint for solving the problem included in the background image IM. In this case, the CPU 21 makes the image object AN1 be displayed in a superimposed manner so as to be superimposed on the background image IM as shown in FIG. 6D based on the drawing information. The drawing information includes, for example, position information (the position information in the form of the coordinate) representing the position on the screen SC pointed by the user UM.

Subsequently, if the user UM performs the delivery operation (NO in the step S5, and YES in the step S6), the CPU 21 determines (step S7) whether or not the CrntID stored in the storage section 27 and the SndID coincide with each other. Here, the background IM is kept displayed, and therefore, the CPU 21 determines "YES" in the step S7. Then, the CPU 21 determines (step S10) whether or not the current display screen includes the drawing information. Here, since the drawing information for drawing the image object AN1 is included, the CPU 21 determines "YES" in the step S10. In this case, the CPU 21 delivers (step S11) the drawing information to the display terminal 30 via the communication section 28. Here, the CPU 21 delivers the drawing information for drawing an image showing the image object AN1 without delivering the image information of the background image IM as shown in FIG. 6E. Since the image information of the background image IM has already been delivered to the display terminal 30, the CPU 21 prevents the image information from being delivered. After delivering the drawing information, the CPU 21 returns the process of the step S3.

It should be noted that in the case in which "YES" has been determined in the step S5, the CPU 21 terminates the delivery operation.

As described above, as long as the information processing device 20 displays the background image represented by the image information having already been delivered to the display terminal 30, the information processing device 20 delivers the drawing information without delivering the image information even if the image object has subsequently been drawn. Thus, compared to the case in which the image information is always delivered by the information processing device 20, the communication load is reduced. As a result, it becomes difficult for a delay to occur in the data delivery for sharing the screen between the information processing device 20 and the display terminal 30.

Further, in the case in which a change occurs in the image information of the background image, the information processing device 20 determines "NO" in the step S7, and delivers the image information thus changed to the display terminal 30. Thus, even in the case in which the image information has been updated, it is possible to promptly share the screen between the information processing device 20 and the display terminal 30.

Display Operation

Figure 7:
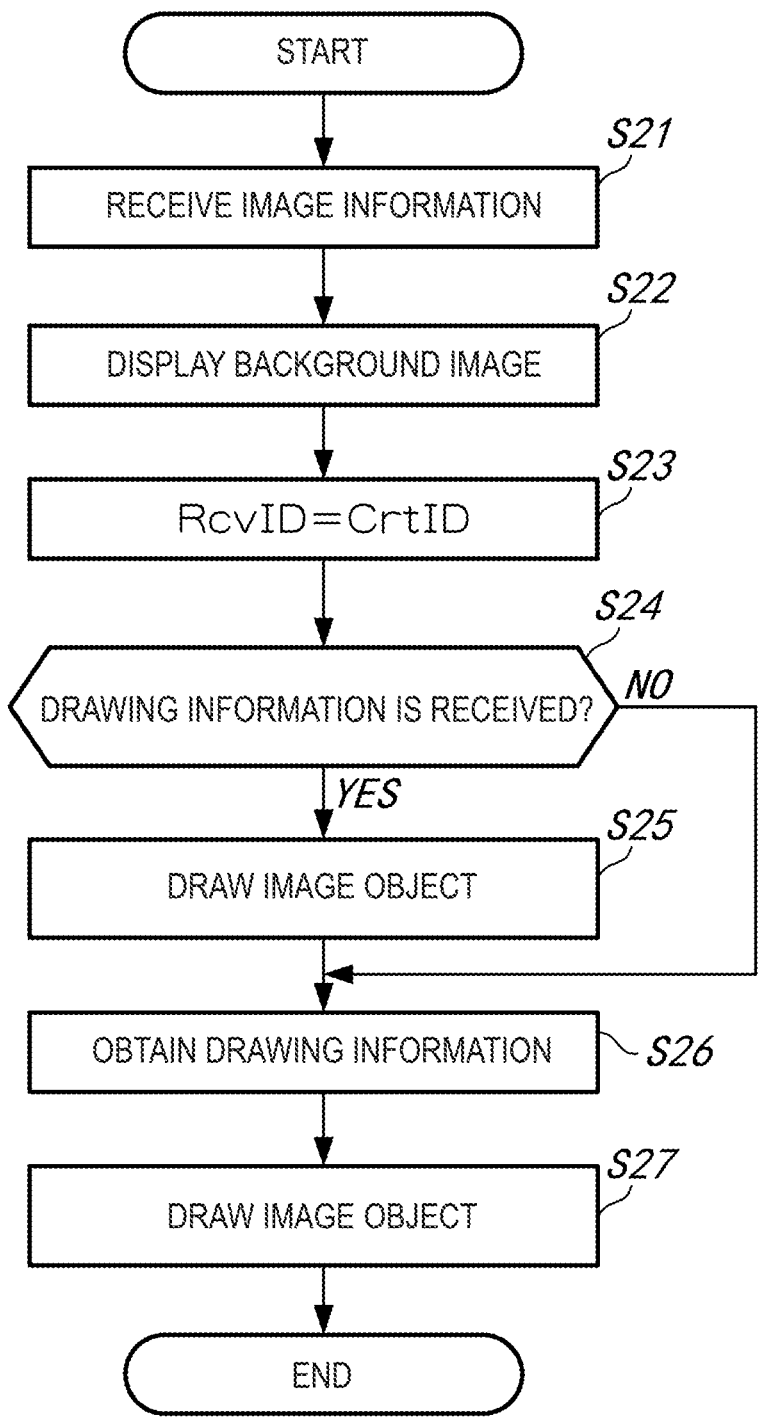
FIG. 7 is a flowchart showing a display operation of the information processing device according to the embodiment.

FIG. 7 is a flowchart showing a display operation of the display terminal 30. The display operation is an operation of displaying the screen based on the data delivered by the information processing device 20 to the display terminal 30.

The CPU 31 of the display terminal 30 receives (step S21) the image information transmitted by the information processing device 20 via the communication section 38. Then, the CPU 31 stores the image information thus received, and then displays (step S22) the background image on the display section 36 based on the image information stored. For example, in the case in which the image information shown in FIG. 6C has been received, the CPU 31 displays the same screen as the screen SC shown in FIG. 6A.

Then, the CPU 31 updates (step S23) RcvID stored in the storage section 37 to the CrntID having been received together with the image information. The RcvID is identification information for uniquely identifying the image information having already been received. Here, the RcvID includes the identification information of all of the image information of the background images having already been received. As described above, the CrntID is the identification information for uniquely identifying the image information of the background image currently displayed by the CPU 21. In the case in which RcvID=CrntID is true, it means that the display terminal 30 has received and stored the image information represented by the CrntID. In the case in which RcvID≠CrntID is true, it means that the display terminal 30 has not yet received the image information represented by the CrntID. The RcvID is used when displaying the thumbnails as a list, which will be described later.

Then, the CPU 31 determines (step S24) whether or not the image information has been received from the information processing device 20 via the communication section 38. Here, when the CPU 31 has determined that the drawing information has been received, the CPU 31 draws (step S25) the image object so as to be superimposed on the background image currently displayed based on the drawing information. For example, in the case in which the drawing information of the image object AN1 shown in FIG. 6E has been received after receiving the image information of the background image IM, the CPU 31 displays the same screen as the screen SC shown in FIG. 6D.

It should be noted that in the case in which "NO" has been determined in the step S24, the CPU 31 makes process proceed to the step S26.

Then, the CPU 31 obtains (step S26) the drawing information in accordance with the operation performed on the operation section 34, and then draws (step S27) the image object (a third image) so as to be superimposed on the background image of the current display screen based on the drawing information thus obtained. In the case in which the operation for drawing the image object has not been performed in the step S26, the CPU 31 skips the process of the step S27.

Due to the display operation described above, the same screen is shared between the information processing device 20 and the display terminal 30.

Thumbnail List Display

Figure 8:
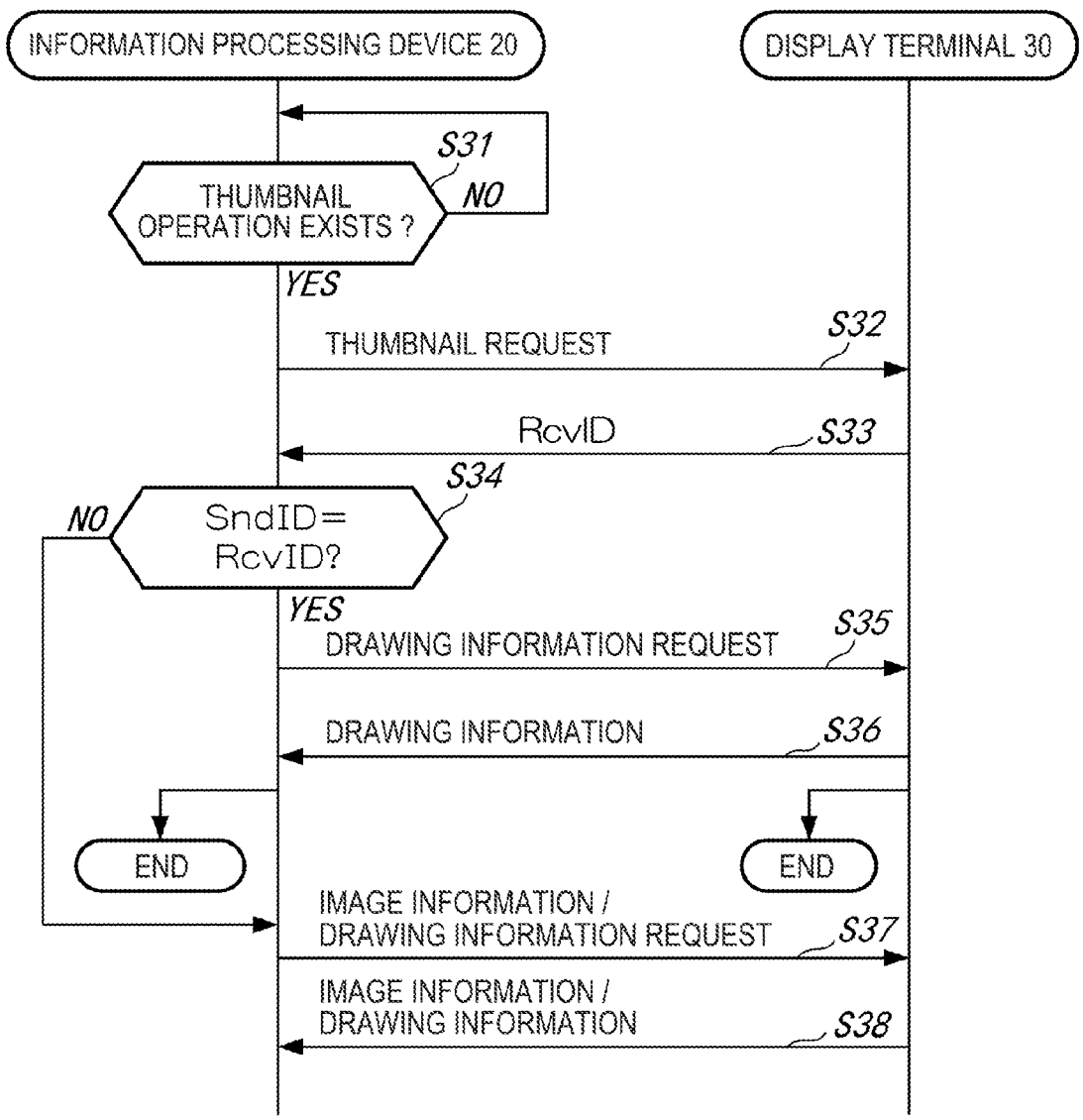
FIG. 8 is a sequence chart showing a process related to list display of thumbnails in the information processing system according to the embodiment.

Then, the thumbnail list display will be explained. FIG. 8 is a sequence chart showing the thumbnail list display in the information processing system 1. FIGS. 9A through 9E are diagrams for explaining a specific example of the thumbnail list display in the information processing system 1.

Firstly, the CPU 21 of the information processing device 20 determines (step S31) whether or not a thumbnail operation has been received. In the case in which the CPU 21 has received the operation of the operation button B2 of the operation menu ME1 shown in FIG. 6B, the CPU 21 determines "YES" in the step S31.

Figure 9A:
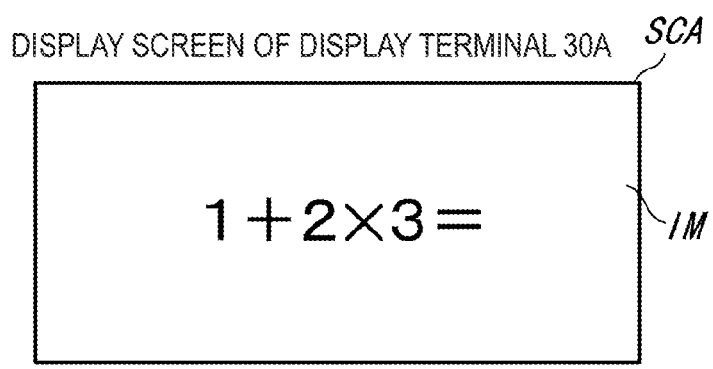
FIGS. 9A through 9E are explanatory diagrams of a specific example of list display of thumbnails in the information processing system according to the embodiment.
Figure 9B:
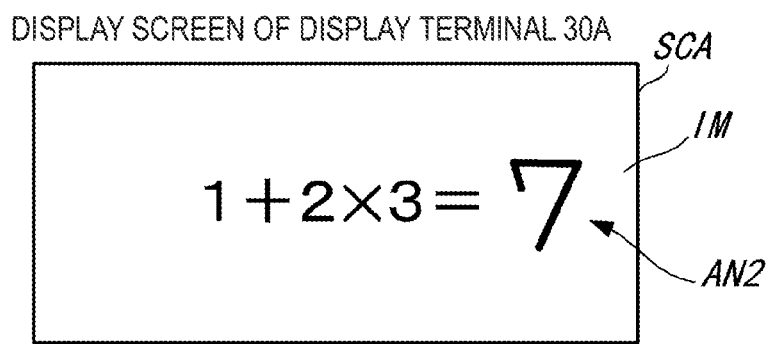
Figure 9C:

Then, the CPU 21 transmits (step S32) a thumbnail request to the display terminal 30 via the communication section 28. When the CPU 31 of the display terminal 30 receives the thumbnail request via the communication section 38, the CPU 31 transmits (step S33) the RcvID stored in the storage section 37 to the information processing device 20 via the communication section 38. The CPU 21 of the information processing device 20 determines (step S34) whether or not the RcvID received coincides with the SndID. Here, in the case in which it has been determined that the RcvID and the SndID coincide with each other, it means that the information processing device 20 stores the image information of the background image currently displayed on the display terminal 30. In this case, the CPU 21 determines "YES" in the step S34, and transmits (step S35) the drawing information request to the display terminal 30. Then, in response to the drawing information request, the CPU 31 of the display terminal 30 transmits (step S36) the drawing information for drawing the image object included in the current display screen to the information processing device 20 via the communication section 38. Here, it is assumed that the display screen SCA as shown in FIG. 9(B) is displayed after an image object AN2 has been drawn on the display screen SCA as shown in FIG. 9(A). The image object AN2 of "7" as the answer has been drawn in the background image IM of the current display screen SCA of the display terminal 30A as shown in FIG. 9B. In this case, the CPU 21 transmits the drawing information for drawing the image object AN2 to the information processing device 20 via the communication section 38 without transmitting the image information of the background image IM as shown in FIG. 9C.

Figure 9D:
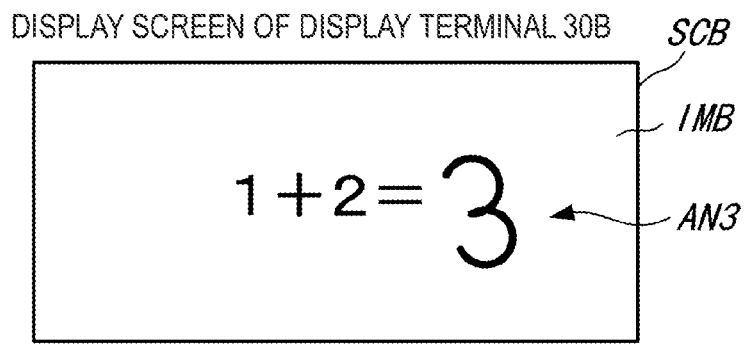
Figure 9E:
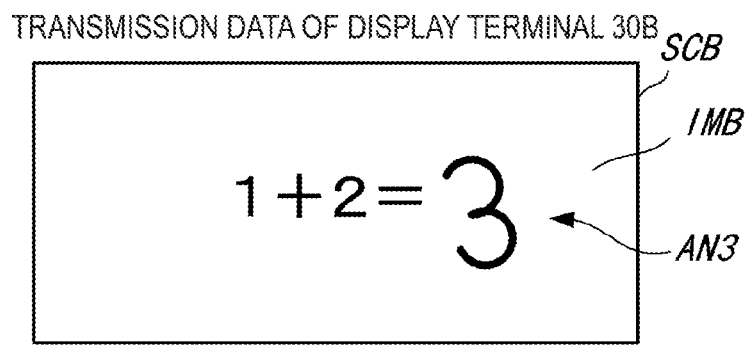

In contrast, in the case in which the RcvID received by the CPU 21 of the information processing device 20 does not coincide with the SndID, it means that the image information of the background image currently displayed in the display terminal 30 is not stored in the information processing device 20. In this case, the CPU 21 determines "NO" in the step S34, and transmits (step S37) an image information/drawing information request to the display terminal 30. Then, in response to the image information/drawing information request, the CPU 31 of the display terminal 30 transmits (step S38) the image information representing the background image currently displayed, and the drawing information for drawing the image object included in the current display screen to the information processing device 20. Here, it is assumed that an image object AN3 is drawn in the background image IMB of the screen SCB as shown in FIG. 9D. In this case, as shown in FIG. 9E, the CPU 21 transmits the image information representing the background image IMB and the drawing information for drawing the image object AN3 to the information processing device 20.

The CPU 21 of the information processing device 20 displays the thumbnail list on the display section 26 based on the data received from the display terminal 30 in such a manner as described above.

Figure 10:
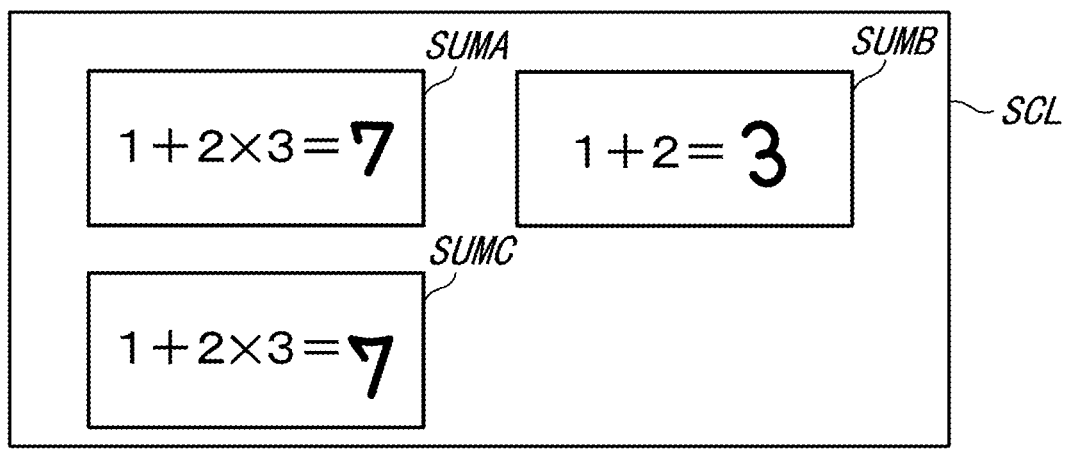
FIG. 10 is an explanatory diagram of a specific example of list display of thumbnails according to the embodiment.

FIG. 10 is a diagram for explaining a specific example of the thumbnail list display. In FIG. 10, the thumbnail list screen SCL includes a thumbnail SUMA representing the display screen of the display terminal 30A, a thumbnail SUMB representing the display screen of the display terminal 30B, and a thumbnail SUMC representing the display screen of the display terminal 30C. Among these thumbnails, the thumbnail SUMA is displayed based on the image information stored in the information processing device 20 and the drawing information received from the display terminal 30A. Thus, compared to the case in which both of the image information and the drawing information are transmitted from the display terminal 30A, the communication load is reduced. The thumbnail SUMB is displayed based on the image information and the drawing information received from the display terminal 30B. Thus, even in the case in which the background image displayed in the display terminal 30 is different from the background image displayed by the information processing device 20, it is possible for the information processing device 20 to use the background image to display the thumbnail.

It should be noted that in the thumbnail SUMC, the image object received from the display terminal 30C is displayed so as to be superimposed on the image information stored by the information processing device 20 similarly to the thumbnail SUMA. Further, in the case in which the CPU 21 has received the operation of selecting the thumbnail, it is also possible for the CPU 21 to display the screen corresponding to the thumbnail in an enlarged manner. Further, in the thumbnail list screen SCL, it is also possible to display all of the thumbnails through a scroll operation or a page switching operation instead of displaying all of the thumbnails at a time.

Display Attribute

The drawing information can include attribute information for designating a display attribute of the image object. The attribute information is the information for designating the attribute of the display of the image object, and the information of designating the configuration of the display of the image object.

Figure 11:
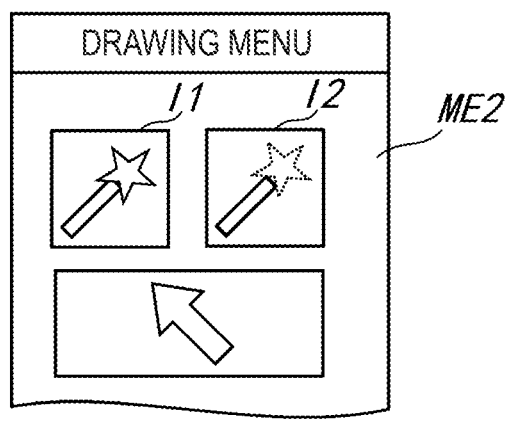
FIG. 11 is an explanatory diagram of a drawing menu according to the embodiment.
Figure 12A:
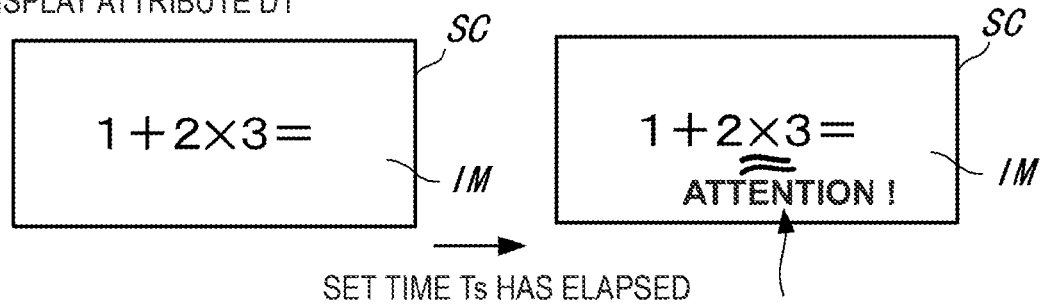
FIGS. 12A and 12B are explanatory diagrams of a display attribute of an image object according to the embodiment.
Figure 12B:
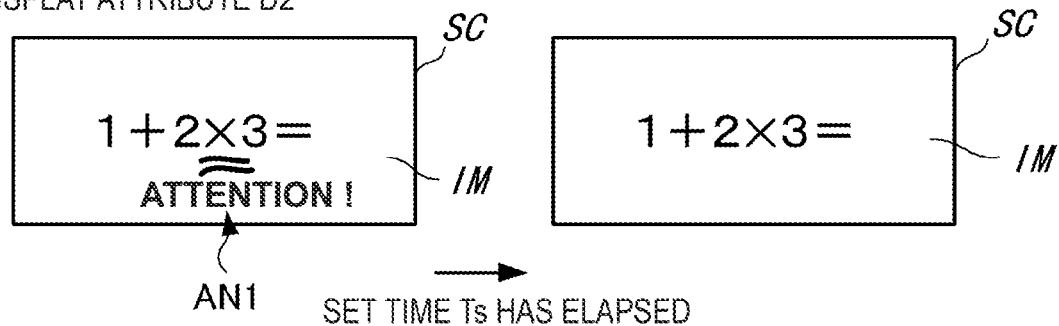

FIG. 11 is a diagram for explaining the drawing menu ME2 for designating the display attribute to draw the image object. The icon I1 shown in FIG. 11 is an icon for including the attribute information of the display attribute D1 in the drawing information. In the case in which the icon I1 is selected and then the image object is drawn, there is provided the display attribute D1 of displaying the image object when the set time Ts has elapsed after the position on the background image has been designated (or, after the image object has been displayed) as shown in FIG. 12A. The icon I2 shown in FIG. 11 is an icon for providing the display attribute D2. In the case in which the icon I2 is selected and then the image object is drawn, there is provided the display attribute D2 of starting displaying the image object when the position on the background image is designated, and then deleting the image object after the set time Ts has elapsed as shown in FIG. 12B. These display attributes are used in the case in which, for example, the teacher limits the time and provides a hint for solving the problem.

The set time Ts can be a fixed time set in advance, or can also be a time set by the user.

As another display attribute, there can be cited a display attribute of designating the display terminal 30 to be made to display the image object. In the case in which the image object has been drawn after the display terminal 30 has been designated using the menu C shown in FIG. 6B, the image object is displayed only in the display terminal 30 thus designated. In this case, the terminal ID for uniquely identifying the display terminal 30 to be made to display the image object is included in the drawing information as the designated ID.

Figure 13A:
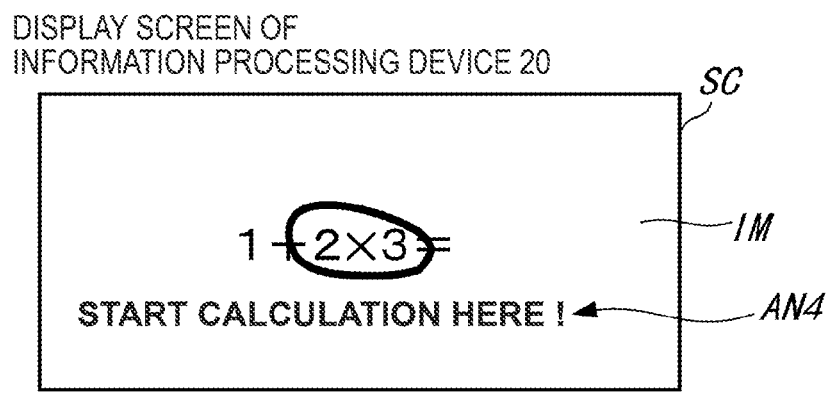
FIGS. 13A through 13C are explanatory diagrams of a display attribute of an image object according to the embodiment.
Figure 13B:
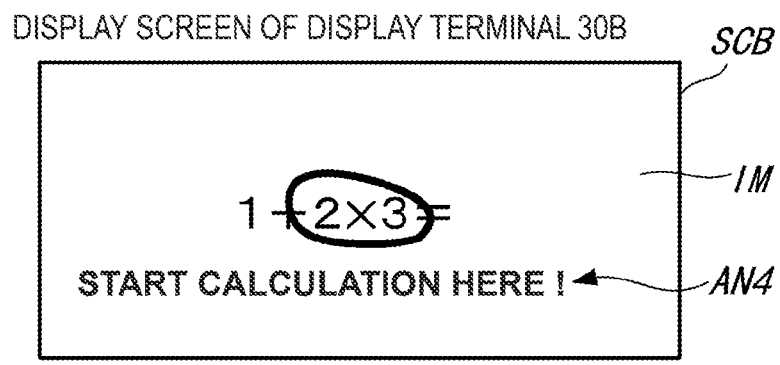
Figure 13C:
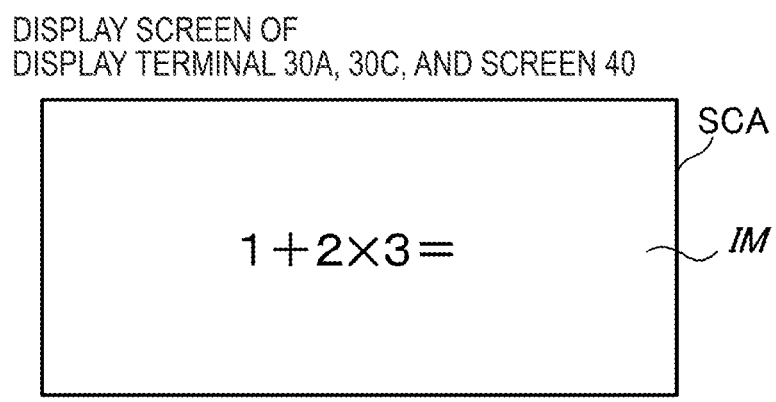

For example, in the case in which the image object AN4 shown in FIG. 13A has been drawn after the display terminal 30A has been designated, the image object AN4 is displayed in the display terminal 30A as shown in FIG. 13B. In contrast, as shown in FIG. 13C, the image object AN4 is not displayed in the display terminals 30B, 30C, and the screen 40. This display attribute is used in the case in which, for example, the teacher provides a specific student with a hint.

Figure 14:
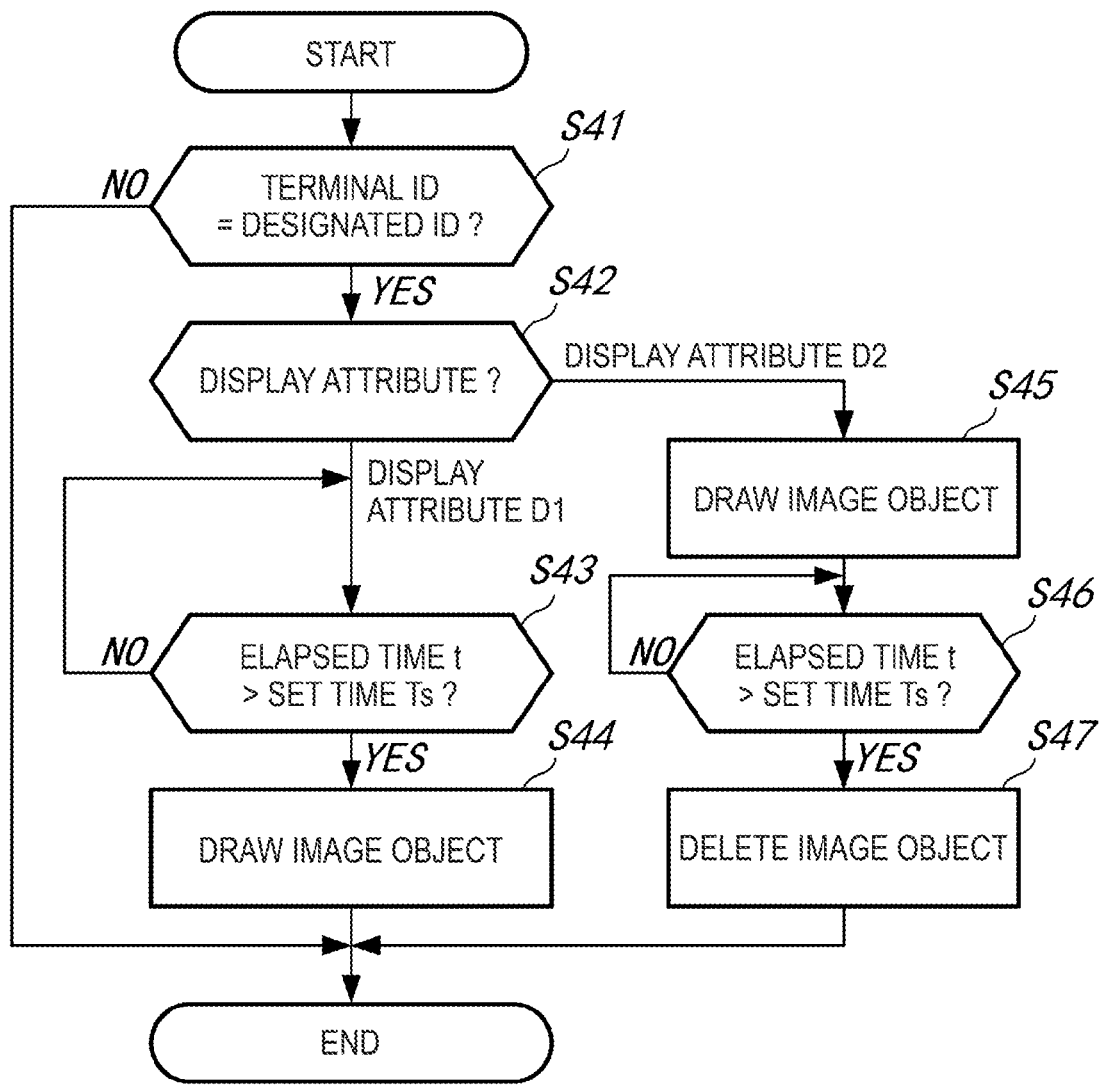
FIG. 14 is a flowchart showing a display operation of the image object according to the embodiment.

FIG. 14 is a flowchart showing the display operation of the image object. Here, the display terminal 30 performs the display operation shown in FIG. 14.

Firstly, the CPU 31 of the display terminal 30 determines (step S41) whether or not the designated ID included in the drawing information coincides with the terminal ID of the own device. In this process, whether or not the display terminal 30 is designated as the device for displaying the image object is determined. In the case in which "NO" has been determined in the step S41, the CPU 31 terminates the process shown in FIG. 14 on the grounds that the own device is not designated as the terminal of displaying the image object.

In the case in which "YES" has been determined in the step S41, the CPU 31 determines (step S42) the display attribute of the attribute information included in the drawing information. In the case in which the display attribute D1 has been determined in the step S42, the CPU 31 determines (step S43) whether or not the elapsed time t from the reception of the drawing information has exceeded the set time Ts. Until the elapsed time t reaches the set time Ts, the CPU 31 determines "NO" in the step S43, and stands ready to draw the image object. Then, when the elapsed time t reaches the set time Ts, the CPU 31 determines "YES" in the step S43, and draws the image object.

In the case in which the display attribute D2 has been determined in the step S42, the CPU 31 draws (step S45) the image object based on the drawing information. Then, the CPU 31 determines (step S46) whether or not the elapsed time t from when the drawing information has been received (or when the image object has been displayed) has exceeded the set time Ts. Until the elapsed time t reaches the set time Ts, the CPU 31 determines "NO" in the step S46, and stands still while displaying the image object. Then, when the elapsed time t reaches the set time Ts, the CPU 31 determines "YES" in the step S46, and deletes (step S47) the image object.

It is also possible for the display attribute explained hereinabove to be used when making the information processing device 20 display the image object having drawn in the display terminal 30. In this case, the display terminal 30 includes the attribute information of designating the display attribute in the drawing information and delivers the drawing information to the information processing device 20. The information processing device 20 displays the image object based on the attribute information included in the drawing information having been received from the display terminal 30. The process of this case can be explained by exchanging "display terminal 30" and "information processing device 20" and further replacing "CPU 31" with "CPU 21" in the explanation of FIG. 14.

Figure 15A:
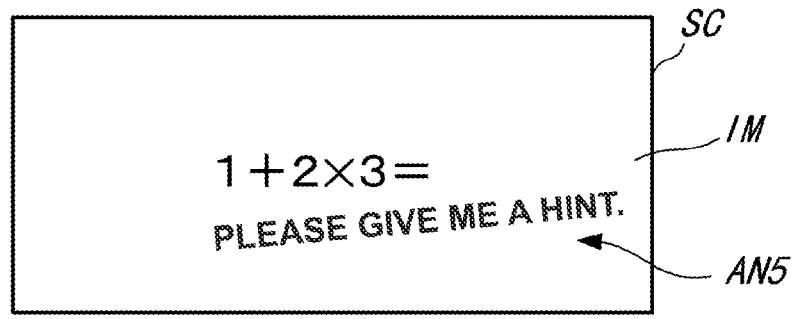
FIGS. 15A through 15C are explanatory diagrams of a specific example of the display operation of the image object according to the embodiment.
Figure 15B:
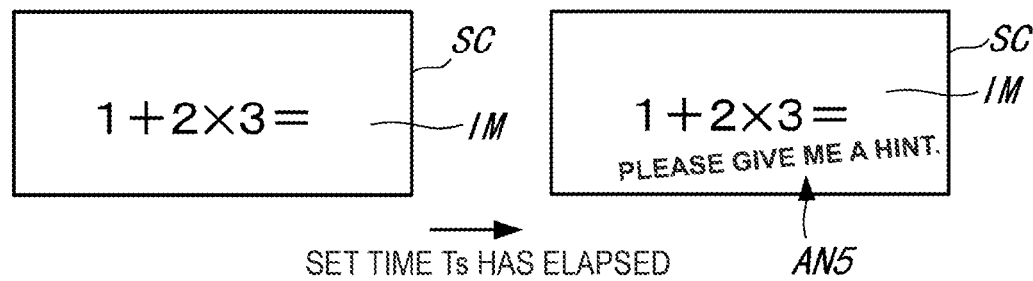
Figure 15C:
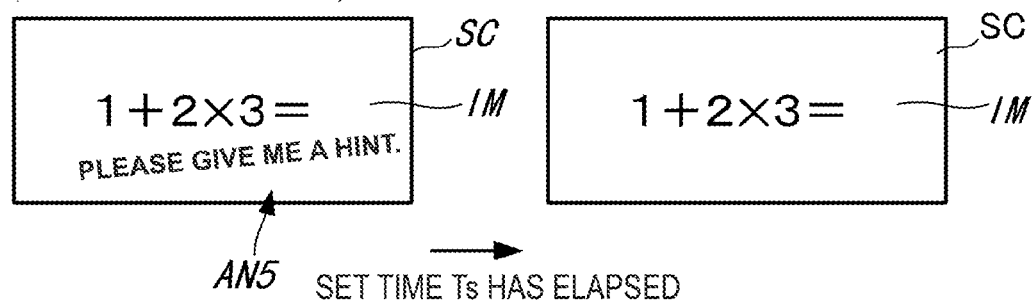

For example, it is assumed that the display terminal 30A draws the image object AN5 of "PLEASE GIVE ME A HINT" as shown in FIG. 15A. In this case, if the CPU 21 of the information processing device 20 has determined that the display attribute D1 has been designated, the CPU 21 of the information processing device 20 displays the image object AN5 after the elapsed time t has reached the set time Is as shown in FIG. 15B. If the CPU 21 of the information processing device 20 has determined that the display attribute D2 has been designated, the CPU 21 of the information processing device 20 displays the image object AN5, and then deletes the image object AN5 when the elapsed time t reaches the set time Is as shown in FIG. 15C.

By using the display attributes described above, in the information processing system 1, the display with the display attribute of the image object can be performed.

Modified Examples

The invention can be implemented in some configurations different from the embodiment described above. Further, it is also possible to arbitrarily combine the modified examples described below with each other.

The display attribute described above can also be one for designating, for example, the color of the image object. In this case, the information processing device 20 displays the image object with colors different by the user. Thus, which user has drawn which image object can easily be figured out.

Further, the display attribute can also be a moment (timing) at which each of the positions on the handwritten image object is pointed. Thus, it is possible for the information processing device 20 to display the stroke order when the image object has been handwritten with animation.

It is also possible for the information processing device 20 to deliver the image information using a part of the image as the background image instead of using the background image in the entire screen displayed on the display section 26. It is also possible for the information processing device 20 to use, for example, an active window as the background image, and deliver the image information for displaying the window.

It is possible for the projector 10 to implement the function of the information processing device 20. In this case, the projector 10 functions as the information processing device according to the invention. In this case, the CPU 11 of the projector 10 implements the function of the CPU 21 explained with reference to FIG. 4.

It is also possible for the information processing device 20 to perform the determination on whether or not the image information of the background image currently displayed is the same as the image information having already been delivered using a method other than the method of determining by comparing the images to be displayed with each other. For example, in the case in which the information processing device 20 receives the operation (e.g., a scroll operation) of changing the area of the background to be displayed on the display section 26, it is also possible for the information processing device 20 to determine that the image information of the background image currently displayed and the image information having already been delivered are different from each other.

It is also possible to eliminate a part of the configuration or the operation of the information processing system 1 according to the embodiment described above. For example, it is also possible to eliminate the projector 10, or it is also possible to use the display device such as a flat panel display (FPD) instead of the projector 10. Further, it is also possible to eliminate the configuration and the operation related to the thumbnail list display or the display attribute. Further, it is sufficient for each of the information processing device 20 and the display terminals 30 to be a display device for displaying an image, and it is possible for each of the information processing device 20 and the display terminals 30 to be a personal computer, a personal digital assistant (PDA), a smartphone, or the like.

In the embodiment described above, each of the functions implemented by the CPU 21 of the information processing device 20 and the CPU 31 of each of the display terminals 30 can be implemented by a combination of a plurality of programs, or can be implemented by a combination of a plurality of hardware resources. Further, in the case in which the function of the CPU 21, 31 is implemented using a program, the program can be provided in a state of being stored in a computer readable recording medium such as a magnetic recording medium (e.g., a magnetic tape, a magnetic disk (hard disk drive (HDD), flexible disk (FD)), an optical recording medium (e.g., an optical disk), a magneto-optical recording medium, or a semiconductor memory, or can also be delivered via a network. Further, the invention can also be figured out as an information processing method.

What is claimed is:

1. An information processing device adapted to communicate with an external terminal device adapted to display an image, the information processing device comprising:
at least one processor configured to:
obtain image information;
perform control of displaying an image based on the image information obtained;
obtain drawing information to be used to draw a second image, the second image is to be superimposed on a first image displayed based on first image information;
determine whether or not the first image information is the same as delivered image information having already been delivered to the terminal device; and
deliver the first image information, the drawing information, and attribute information adapted to designate a display attribute of the second image, to the terminal device in a case in which it is determined that the first image information and the delivered image information are different from each other, and deliver the drawing information to the terminal device without delivering the first image information in a case in which it is determined that the first image information and the delivered image information are the same as each other,
wherein
the attribute information includes first attribute information indicating a timing of displaying the second image on the terminal device, and
when the second image is associated with the first attribute information, the display of the second image on the terminal device is delayed for a predetermined amount of time from a time when the drawing information is delivered to the terminal device.

2. The information processing device according to claim 1, wherein the attribute information includes second attribute information adapted to designate one of the terminal device to be made to display the second image.

3. The information processing device according to claim 1, wherein the at least one processor is further configured to:
receive drawing information, which is adapted to draw a third image so as to be superimposed on the first image, from the terminal device, and
draw the third image so as to be superimposed on the first image based on the drawing information received from the terminal device.

4. The information processing device according to claim 3, wherein the at least one processor is further configured to:
receive attribute information adapted to designate a display attribute of the third image, and
draw the third image in accordance with the display attribute designated by the attribute information received from the terminal device.

5. The information processing device according to claim 1, wherein
the attribute information includes third attribute information indicating a timing of displaying the second image on the terminal device, and
when the second image is associated with the third attribute information, the display of the second image on the terminal device is deleted after a predetermined amount of time from a time when the second image is displayed on the terminal device has elapsed.

6. An information processing system comprising:
a terminal device adapted to display an image; and
an information processing device adapted to communicate with the terminal device,
wherein the information processing device includes at least one processor configured to:
obtain image information,
perform control of displaying an image based on the image information obtained,
obtain drawing information to be used to draw a second image, the second image is to be superimposed on a first image displayed based on first image information,
determine whether or not the first image information is the same as delivered image information having already been delivered to the terminal device, and
deliver the first image information, the drawing information, and attribute information adapted to designate a display attribute of the second image, to the terminal device in a case in which it is determined that the first image information and the delivered image information are different from each other, and deliver the drawing information to the terminal device without delivering the first image information in a case in which it is determined that the first image information and the delivered image information are the same as each other, and the terminal device includes at least one processor configured to:
receive the first image information delivered by the information processing device,
receive the drawing information delivered by the information processing device, and
perform control of displaying the first image based on the first image information received, and draw the second image so as to be superimposed on the first image based on the drawing information received,
wherein
the attribute information adapted to designate a display attribute of the second image is delivered to the terminal device,
the attribute information includes first attribute information indicating a timing of displaying the second image on the terminal device, and
when the second image is associated with the first attribute information, the display of the second image on the terminal device is delayed for a predetermined amount of time from a time when the drawing information is delivered to the terminal device.

7. An information processing method comprising:
obtaining image information;
performing control of displaying an image based on the image information obtained;
obtaining drawing information to be used to draw a second image, the second image is to be superimposed on a first image displayed based on first image information;
determining whether or not the first image information is the same as delivered image information having already been delivered to an external terminal device adapted to display an image; and
delivering the first image information, the drawing information, and attribute information adapted to designate a display attribute of the second image, to the terminal device in a case in which it is determined that the first image information and the delivered image information are different from each other, and delivering the drawing information to the terminal device without delivering the first image information in a case in which it is determined that the first image information and the delivered image information are the same as each other,
wherein
the attribute information includes first attribute information indicating a timing of displaying the second image on the terminal device, and
when the second image is associated with the first attribute information, the display of the second image on the terminal device is delayed for a predetermined amount of time from a time when the drawing information is delivered to the terminal device.

* * * * *